United States Patent
Wu et al.

(10) Patent No.: US 7,216,133 B2
(45) Date of Patent: May 8, 2007

(54) SYNCHRONIZING LOGICAL VIEWS INDEPENDENT OF PHYSICAL STORAGE REPRESENTATIONS

(75) Inventors: Yunxin Wu, Kirkland, WA (US); Shaoyu Zhou, Issaquah, WA (US); Lev Novik, Bellevue, WA (US); Irena Hudis, Bellevue, WA (US); Ashish B. Shah, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 10/629,254

(22) Filed: Jul. 29, 2003

(65) Prior Publication Data

US 2005/0027747 A1    Feb. 3, 2005

(51) Int. Cl.
*G06F 17/30* (2006.01)
(52) U.S. Cl. .................. 707/203; 707/102; 707/201
(58) Field of Classification Search ............... 707/101, 707/102, 201, 200; 709/248
See application file for complete search history.

(56) References Cited

U.S. PATENT DOCUMENTS

| | | | | |
|---|---|---|---|---|
| 5,392,390 | A * | 2/1995 | Crozier ....................... | 715/762 |
| 5,943,676 | A * | 8/1999 | Boothby ...................... | 707/201 |
| 6,151,606 | A * | 11/2000 | Mendez ....................... | 707/201 |
| 6,295,541 | B1 * | 9/2001 | Bodnar et al. ............... | 707/203 |
| 6,393,434 | B1 * | 5/2002 | Huang et al. ................ | 707/200 |
| 6,401,104 | B1 * | 6/2002 | LaRue et al. ................ | 707/203 |
| 6,405,218 | B1 * | 6/2002 | Boothby ...................... | 707/201 |
| 6,535,892 | B1 * | 3/2003 | LaRue et al. ................ | 707/203 |
| 6,553,037 | B1 * | 4/2003 | Pivowar et al. ............. | 370/463 |
| 6,721,871 | B2 * | 4/2004 | Piispanen et al. ............. | 712/1 |
| 6,839,564 | B2 * | 1/2005 | Sutinen et al. .............. | 455/502 |
| 6,925,477 | B1 * | 8/2005 | Champagne et al. ....... | 707/203 |
| 6,973,299 | B2 * | 12/2005 | Apfel ........................ | 455/412.2 |
| 7,007,041 | B2 * | 2/2006 | Multer et al. ................ | 707/201 |
| 7,039,656 | B1 * | 5/2006 | Tsai et al. ................... | 707/201 |
| 2003/0158753 | A1 | 8/2003 | Bernston et al. ............... | 705/2 |
| 2003/0182327 | A1 * | 9/2003 | Ramanujam et al. ....... | 707/204 |

OTHER PUBLICATIONS

Ren, Legang, et al. "Data Synchronization in the Mobile Internet" Beijing, University of Posts and Telecommunications, Sep. 25, 2002, pp. 95-98.
Synchronizing Data Access Critiquing The Three major types of Concurrency Control, SQL for Smarties, Joe Celko p. 22, 24 Mar. 1998.

* cited by examiner

*Primary Examiner*—Tim Vo
*Assistant Examiner*—Dangelino Gortayo
(74) *Attorney, Agent, or Firm*—Workman Nydegger

(57) ABSTRACT

Systems, methods, and computer program products for synchronizing items at replicas within a topology is disclosed. Items are stored in physical tables at the replicas. The physical table layouts at each replica can differ but are mapped to a common logical view. When a replica receives an indication that synchronization should be performed, the replica determines if changes have been made at the replica that should be mapped to the logical views. Replicas can facilitate this by comparing local change enumerations for changes made in physical tables to synchronization local change enumerations for changes in the logical views. Any changes that need to be synchronized are sent through the logical views to other replicas in the topology.

12 Claims, 9 Drawing Sheets

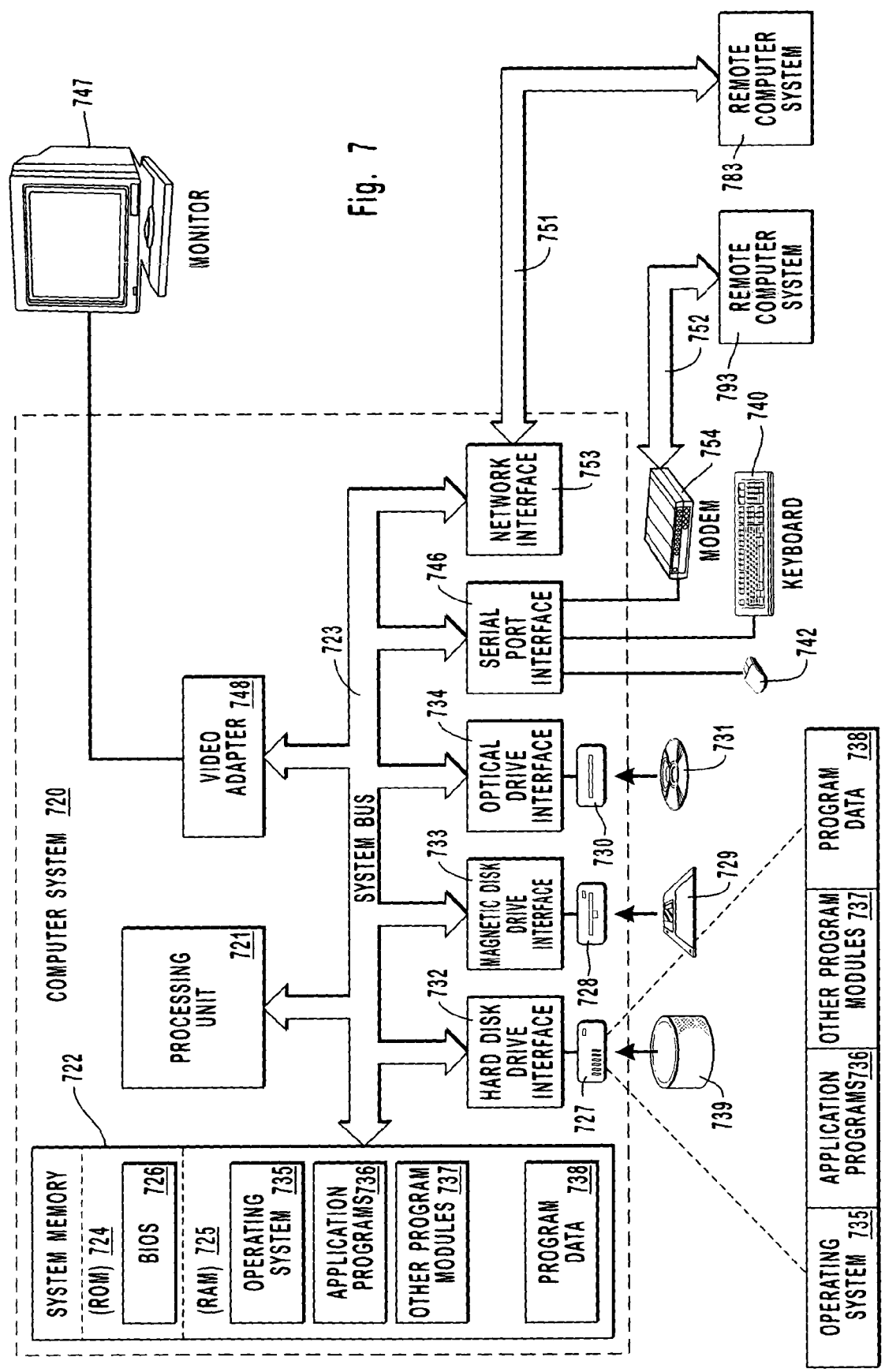

SYNCHRONIZING LOGICAL VIEWS INDEPENDENT OF PHYSICAL STORAGE REPRESENTATIONS

BACKGROUND OF THE INVENTION

1. The Field of the Invention

The invention generally relates to data processing and handling. More specifically, the invention relates to the field of data synchronization between computer systems.

2. Background and Relevant Art

Within computer systems, data synchronization is an important function. There is often a need to have the same data available in a number of different settings and locations. Among the many examples where it is useful to synchronize data, one illustrative example involves a digital address book. A computer user may have a digital address book stored at their desktop work computer. While at work, this is a convenient and accessible location to store addresses, phone numbers and general contact information. While away from the work location, the computer user may need their address book in a mobile form such as at a personal digital assistant (PDA) or other mobile information storage system. The contact information at the PDA should match the contact information at the desktop work computer.

Further, the same computer user may have a home computer where the contact information is stored. Ideally, the contact information at the home computer, the PDA and the work computer should all be in synchronization. Returning to the computer user's work location, some of the data that is stored in the digital address book may be information that is available to other computer users within the organization where the computer user works. Thus, this data may also be stored in a centralized database accessible by a number of different computer users and yet still be able to be synchronized with the computer user's PDA, work computer and home computer.

Accordingly, in the example illustrated above, there are at least four different types of platforms for storing the digital address book. Namely, a work computer, a PDA, a home computer and a centralized database. Each of these platforms may have a replica that stores a copy of the digital address book in a data store.

Data in each data store may be maintained in different physical arrangements, for example, in a physical table and/or group of physical tables. The physical tables are an actual arrangement of the data at a computer storage device such as a database mass storage array, a computer hard drive or flash memory. As can be appreciated, each of the different platforms may store, in a replica, the exact same data that is in the other replicas. However, because of the limitations or features of a particular platform, the data may be stored in a different physical arrangement at the particular platform (i.e. in a different physical table arrangements or in files). Physically storing data differently at different replicas within the same topology presents various challenges when synchronizing the different replicas with each other.

Data at a replica is generally divided into discrete groupings of data often a referred to as "items." For example in a digital address book, an item may be a name, and address, a phone number, an entire contact, or any other discrete grouping. In other examples, an item may be a file, an image, a folder, etc. Items at a replica can be changed by, for example, adding, deleting, and modifying an item. Due to different physical arrangements, it can be difficult to synchronize changes between replicas.

Another challenge that arises in synchronizing data at different replicas relates to the context of synchronization data granularity. As previously mentioned, data in a replica can be divided into items. These items represent discrete pieces of information that are synchronized. Commonly, the granularity of an item is defined and unchangeable for a particular replica topology. In the digital address book example, an item has a fine granularity when the item is a single field of a contact, e.g., first name, last name, phone number, street address, state, or ZIP code. In contrast, an item has a medium granularity when the item is such as one of full name (both first and last), contact numbers, or address. An item with coarse granularity might include an entire contact as an item in the replica.

Synchronization of items within the replica often requires metadata to be associated with each item. The metadata may include information such as a time stamp indicating when the item was last changed. If the item granularity is too fine, an excess of metadata can unnecessarily consume resources (e.g., storage and system memory) of the particular replica since each item must have associated metadata. For example, in the digital address book discussed above if the item granularity includes street address, city and ZIP code, metadata for each of the three items would need to be maintained. However, it is likely that a change in a street address would also result in a change in the city and ZIP code, meaning that metadata for city and ZIP are typically changed when street is updated.

On the other hand, if the granularity is too coarse, at least two problems arise, namely; too much synchronization data may need to be transmitted during synchronization and unnecessary conflicts may appear. For example in the digital address book discussed above, if the item is defined in terms of an entire contact, a change in any part of the contact results in the entire contact being sent during the synchronization. Much of this data may already be synchronized between the replicas in a topology. Therefore, redundant data is sent between two replicas during synchronization. For example, a change to a telephone number in a contact does not require that name and address information be sent to synchronize a corresponding contact. However, when an item is defined as an entire contact, a change to telephone number nonetheless causes name and address to be sent during synchronization. Thus, communication recourses are consumed to transfer data that is already synchronized.

Further, when item definitions are too coarse, the replicas may inappropriately detect a conflict between data at the replicas. For example, if the phone number of a contact is changed at a first replica and the address of the contact is changed at a second replica, the first and second replicas may appear to be in conflict if the item granularity is an entire contact. However, no real conflict may exist as the change in phone number may be completely valid and is independent of the change in the address.

In commercial digital storage applications, optimizations are often not discovered until after the particular application has been on sale and used by a number of users and optimizations can result in changes to the physical storage. Thus, a physical table containing data at an earlier version of a digital storage application may not have the same layout as a physical table storing the same data in a later version of the digital storage application. To synchronize data between different versions of a digital storage application can require that new code be written to utilize the optimizations of the later version and, yet, still provide synchronization capabilities.

While the above examples have been framed in the context of a digital address book, there are many other environments that utilize data synchronization. Some examples include document versioning, sharing files and information, software updates, etc. Each of these environments, as well as other environments, can suffer from the challenges described above. Accordingly, synchronization mechanisms that more efficiently utilize computer system and communication resources would be advantageous. Synchronization mechanisms that more appropriately detect data conflicts would also be advantageous.

BRIEF SUMMARY OF THE INVENTION

The principles of the present invention provide for synchronizing replicas. A computer system includes a source replica that is one of a number of replicas included in a topology (e.g. in a computer network topology). The computer system receives a synchronization indication (e.g., a request synchronization message) that the source replica is to synchronize with a destination replica. The computer system determines if items have changed in a physical layout (e.g., within a database table) at the source replica. In one example, the computer system compares a local change enumeration with a synchronization local change enumeration.

When the comparison so indicates, for example, when the local change enumeration and the synchronization local change enumeration differ, it is determined that the items in the physical layout have changed. The computer system maps any changed items in the physical layout at the source replica to a logical view, that is substantially similar to logical views at one or more other replicas in the topology. Catalogs at each replica control mapping from the physical layout to the logical view to cause logical views to be substantially similar. The computer system sends at least one item mapped to the logical view to the destination replica.

The principles of the present invention also provide for a computer system synchronizing data with other computer systems in a topology. The computer system includes a data store layer that includes a number of items and a local change tracker that maintains local change enumerations for the number of items. The computer system further includes a synchronization layer that includes a logical view substantially similar to logical views at one or more other computer systems in the topology. The logical view representing a mapping of one or more items from the number of items. The synchronization layer further including a synchronization change tracker that maintains versions and synchronization local change enumerations for the one or more items mapped to the logical view.

The principles of the present invention also provide for generating a mapping of the physical layout of items in a data store to a logical view. A computer system accesses core code that can be used to facilitate compilation of logical schemas. The computer system accesses a logical schema that includes definitions of a change unit and a consistency unit. A change unit is configurable such that a developer can allocate the size of a change unit based on available resources. For example, on low bandwidth or high latency network connections lower granularity, resulting in smaller items and less data on the network can be used. A consistency unit is also configurable such that the developer can group items together that should be synchronized together. For example, a developer may group the items that make up an address together, as a change to any of these items can result in a change to all of them.

The computer system utilizes the core code to compile the logical schema into at least a catalog mapping items from a physical layout to a logical view. Compilation can also result in procedures or functions being generated. The procedures or functions indicate how items are stored at a physical layout. Through access to the procedures or functions, the catalog can map the physical layout of data to a logical view that is substantially similar to logical views at one or more other computer systems. Using similar logical views among a number of computer systems can facilitate more efficient synchronization between replicas.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates a suitable operating environment for the principles of the present invention.

DETAILED DESCRIPTION OF THE PREFERRED EMBODIMENTS

The present invention extends to systems, methods, and computer program product for synchronizing items at replicas through logical views. Replicas utilize catalogs to map items from a physical layout to a logical view. Catalogs can be compiled from logical schemas that facilitate the mapping of data from different physical layouts (e.g., at a plurality of different replicas) to substantially similar logical views (e.g., shared among the plurality of different replicas). Embodiments of the present invention may comprise a special purpose or general-purpose computer including various items of computer hardware, as discussed in greater detail below.

Figure 1:
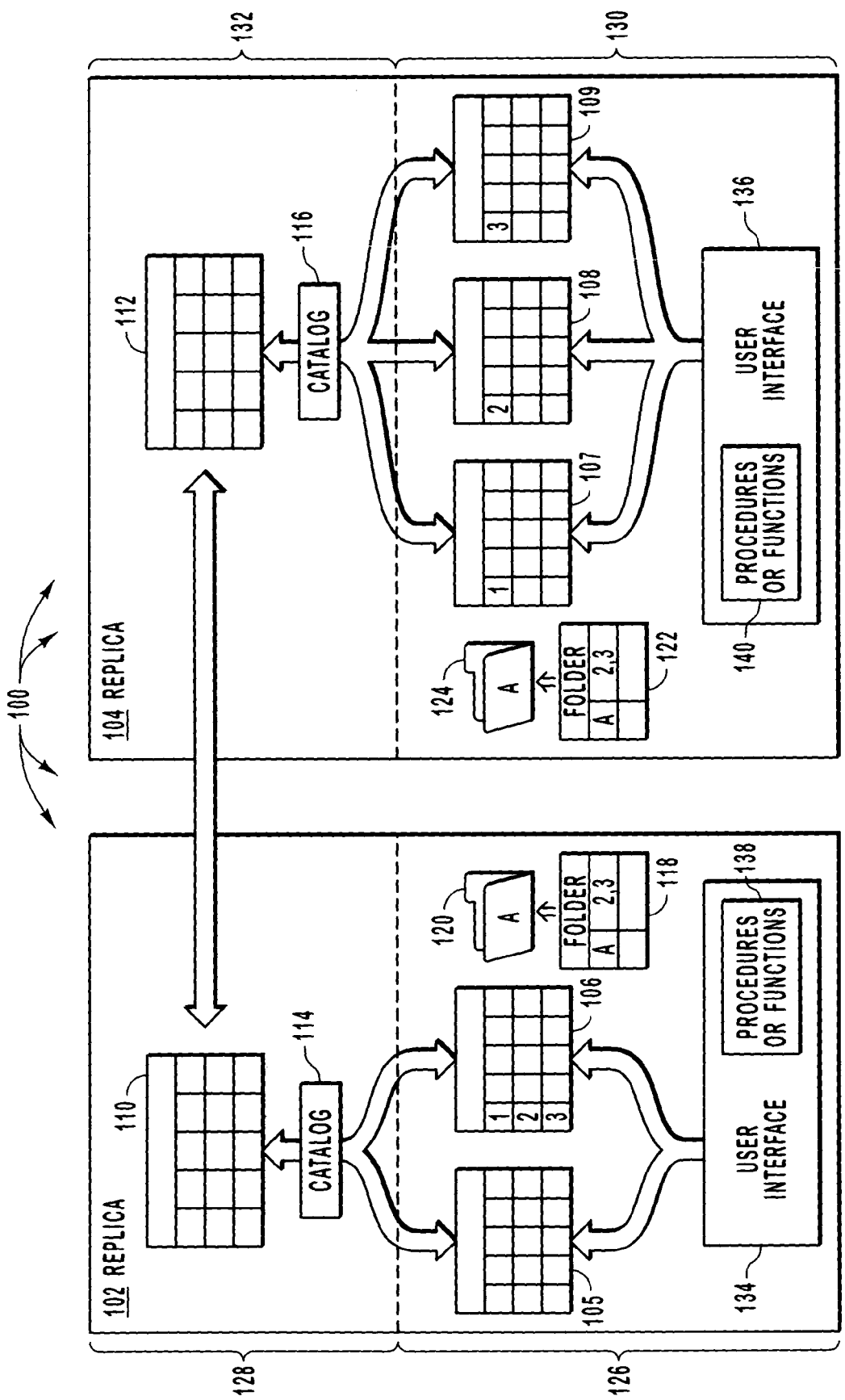
FIG. 1 illustrates an example computer architecture including replicas that can be synchronized in accordance with principles of the present invention.

Referring now to FIG. 1, an example computer architecture including replicas that can be synchronized in accordance with principles of the present invention is shown. FIG. 1 shows a topology 100. The topology 100 includes a replica 102 and a replica 104, which may at computer systems connected to a common network (e.g., a LAN, WAN, or even the Internet). Replica 102 is divided into a data store layer 126 and a synchronization layer 128. Replica 104 is also divided into a data store layer 130 and a synchronization layer 132. Replica 102 includes physical tables 105 and 106 that include the data of replica 102 stored in the data store layer 126. Replica 104 also includes physical tables 107, 108, and 109 that include the data of the replica 104 stored in the data store layer 130.

The physical tables 105 and 106; and 107, 108, and 109 may contain the same information; however the tables may be physically arranged with significant differences. These differences may be the result of the type of replica at which the tables reside. For example, optimizations on server replicas may be different than the optimizations on client replicas resulting in different physical table layouts. Alternatively, the physical tables may reside at different versions of the same commercial software. Often a later version of the commercial software application will contain optimizations and has a different physical table layout than previous versions of the physical tables.

Items may be input into the tables 105 and 106 at replica 102 through a user interface 134. The user interface 134 contains code that directs the table layout of items added to or changed in the tables 105 and 106. In one embodiment of the invention, this code is procedures or functions code 138. Replica 104 contains a user interface 136 that functions similarly to the user interface 134 in replica 102. The user interface 136 may also utilize procedures or functions code 140.

Replica 102 also includes a logical view 110. The physical tables 105 and 106 are mapped to the logical view 110. Replica 104 also includes a logical view 112. The physical tables 107, 108, and 109 are mapped to the logical view 112. The logical views 110 and 112 may be substantially similar logical views, for example, logical views 110 and 112 may both represent contact information. Items can be represented similarly in both logical views 110 and 112. In one embodiment of the invention, mapping from the tables 105 and 106 to the logical view 110 at replica 102 is accomplished by using a catalog 114 (in the synchronization layer 128) that contains information about the physical storage locations of items at replica 102. Mapping on replica 104 is similar to that on replica 102. The replicas 102 and 104 synchronize through the logical views 110 and 112. In one embodiment of the invention, an XML or other logical schema to physical schema mapping document (as will be described in more detail below) is compiled to create a catalog and procedures or functions.

In one exemplary embodiment, synchronization is performed in response to an indicator received by replica 102 that synchronization should be initiated. The indicator may include: a recognition by replica 102 that it has items in the tables 105 and 106 that have been changed or added through the user interface 134; receiving a request from Replica 104 for synchronization; or any other suitable indicator. Replica 102 then maps any items in the physical tables 105 and 106 that need to be mapped to the logical view 110 through the catalog 114. Items are then sent from the logical view 110 in replica 102 to the logical view 112 in replica 104. Replica 104 can then map the sent items from the logical view 112 through the catalog 116 into the physical tables 107, 108, and 109.

In one embodiment of the invention, the scope of synchronization can be controlled through the use of folders. Folders are logical constructs used for grouping items together. Thus by synchronizing folders, those items grouped in a common folder can be synchronized. Using folders, synchronization can be done on less than all of the items stored on a replica by only synchronizing those items grouped in a folder. An example of folder grouping is shown in FIG. 1. Folder grouping can be accomplished by using a folder table in the data store layer at a replica. FIG. 1 illustrates this concept by showing a table 106 in a data store layer 126. The table 106 comprises data items labeled 1, 2, and 3. A folder table 118 contains an entry A corresponding to identification numbers 2 and 3. This table entry represents a folder 120 labeled A that contains the data items labeled 2 and 3. Replica 104 has a corresponding logical construct including tables 107, 108, and 109 storing data items labeled 1, 2, and 3. These items correspond to the items labeled 1, 2, and 3 at replica 102, although they are stored physically different. A folder table 122 is stored in the data store layer 126 of replica 104. The folder table 122 maps to a folder 124 labeled A. Thus, replica 102 can synchronize with replica 104 at a folder level.

Figure 2A:
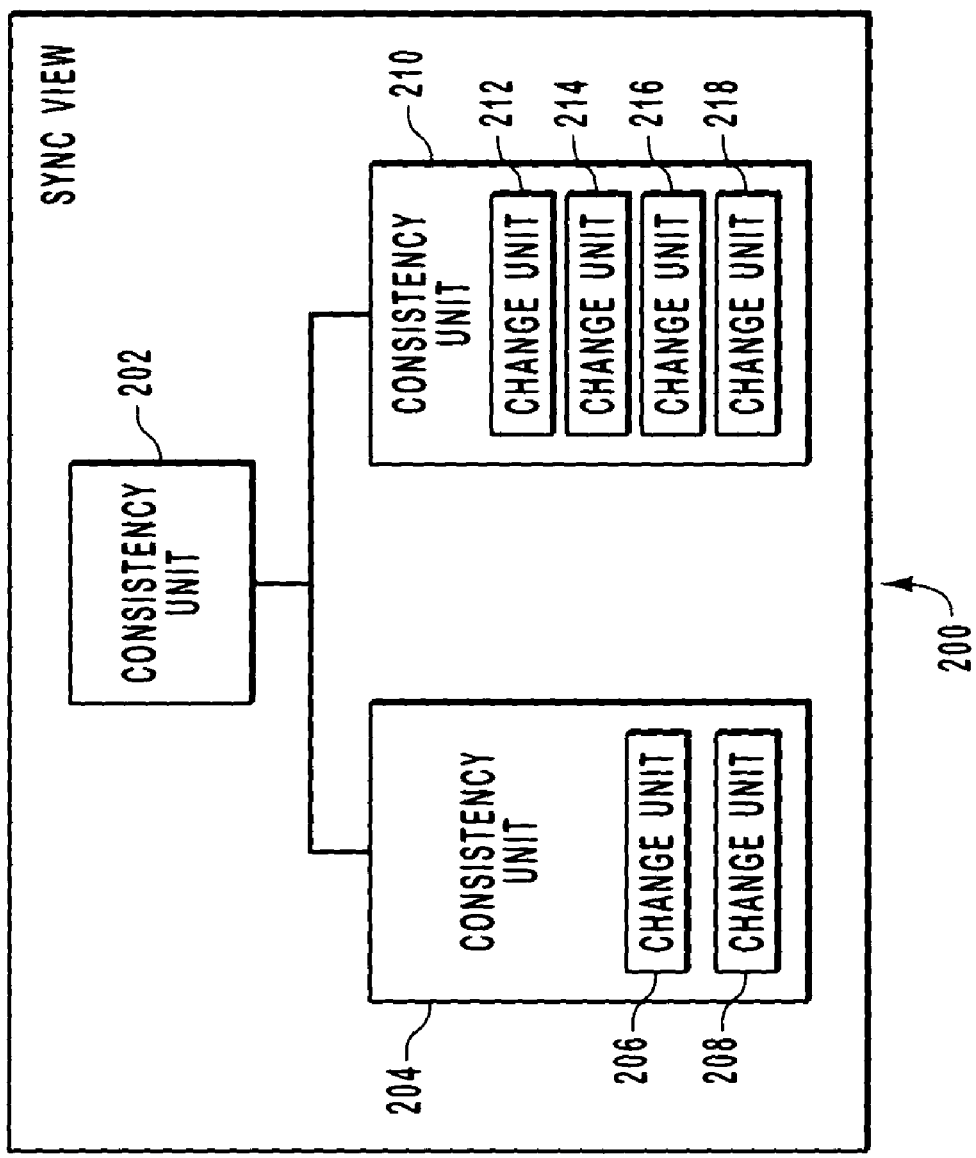
FIG. 2A illustrates an example structure for defining consistency units and change units in accordance with principles of the present invention.

The logical views may be defined in terms of an XML schema or some other tree like data structure. An example of such a data structure is shown in FIG. 2A. To understand logical views a number of other terms must first be understood. For example a consistency unit represents a minimum group of item changes that can be reported during synchronization. One example of data that might be defined in terms of a consistency unit is an address. And address is composed of several individual components including a street, a city, a state and a ZIP code. When an address is updated, typically several of these items are changed. Therefore, if during synchronization only a portion of these items that are changed are transmitted and changed at the replica to which they were transmitted, inconsistent and nonsensical addresses may result in the replica. As such, an address defined as a consistency unit will only be updated at the replica during synchronization if each of the changed components of the consistency unit, i.e. the street, city, state, and ZIP code, is sent during the same synchronization.

Another concept that should be understood is the concept of a change unit. The change unit is a construct defining the boundary of an item. In other words, if any part of a change unit is modified, the entire change unit will be synchronized at a subsequent synchronization. In one example, a change unit may be defined as a telephone number. A change to the area code will result in the entire telephone number being sent during a subsequent synchronization.

Figure 2B:
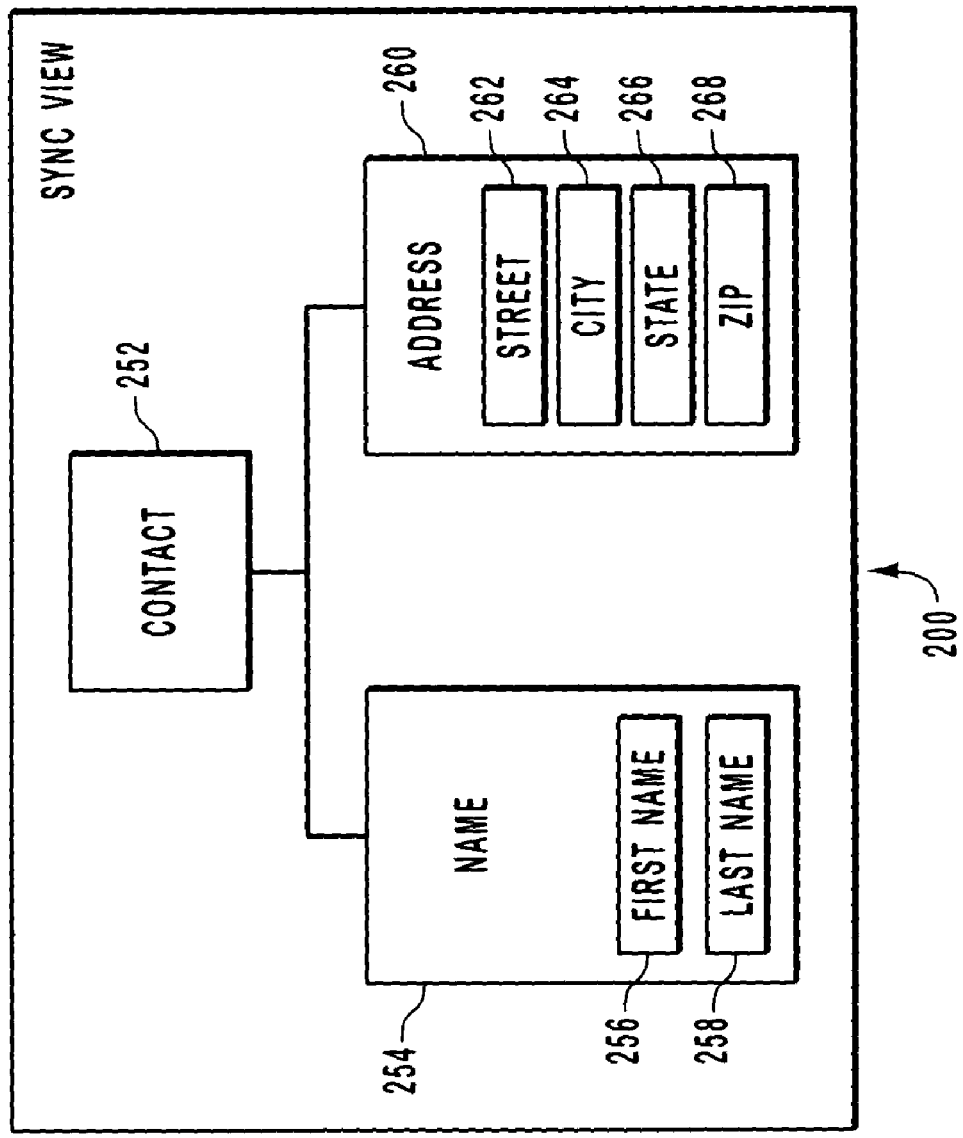
FIG. 2B illustrates an example structure for defining consistency units and change units in accordance with principles of the present invention.

Referring now to FIG. 2A consistency units and change units are illustrated as shown in a generalized view of a logical schema 200. Logical schema 200 includes a top level consistency unit 202. The top-level consistency unit 202 has appended to it two lower level consistency units. The first lower level consistency unit 204 includes change units 206 and 208. The second lower level consistency unit 210 includes a change unit 212, 214, 216 and 218. A more specific example of the logical schema 200 is shown in FIG. 2B which shows a contact 252 (corresponding to the top level consistency unit 202). A name 254 (corresponding to the first appended consistency unit 204) is illustrated within the contact 252. The name 254 includes a first name 256 and a last name 258. An address 260 (corresponding to the second consistency unit 210) is illustrated and includes a street 262, a city 268, a state 266, and a ZIP code 268.

Embodiments of the invention contemplate definable consistency units and change units. Consistency units and change units can be defined for example in an XML schema for each particular application. In one embodiment of the invention, a developer creates XML schema. This XML schema is stored at a computer system that comprises core code. The core code at the computer system compiles the XML schema. Compiling the XML schema results in the creation of a catalog (such as catalog 114 in replica 102 as shown in FIG. 1) used to map items between logical views and physical tables (such as logical view 110 and physical tables 105 and 106 in replica 102 shown in FIG. 1). Compiling may also cause procedures or functions code to be generated. The procedures or functions code can be stored at the data base layer of a replica (such as database layer 126 at replica 102 shown in FIG. 1). The procedures or functions code provides functionality for storing items in the physical storage (such as physical tables 105 and 106 shown in FIG. 1) such as directing how items will be stored in the tables or other storage arrangement.

Figure 3A:
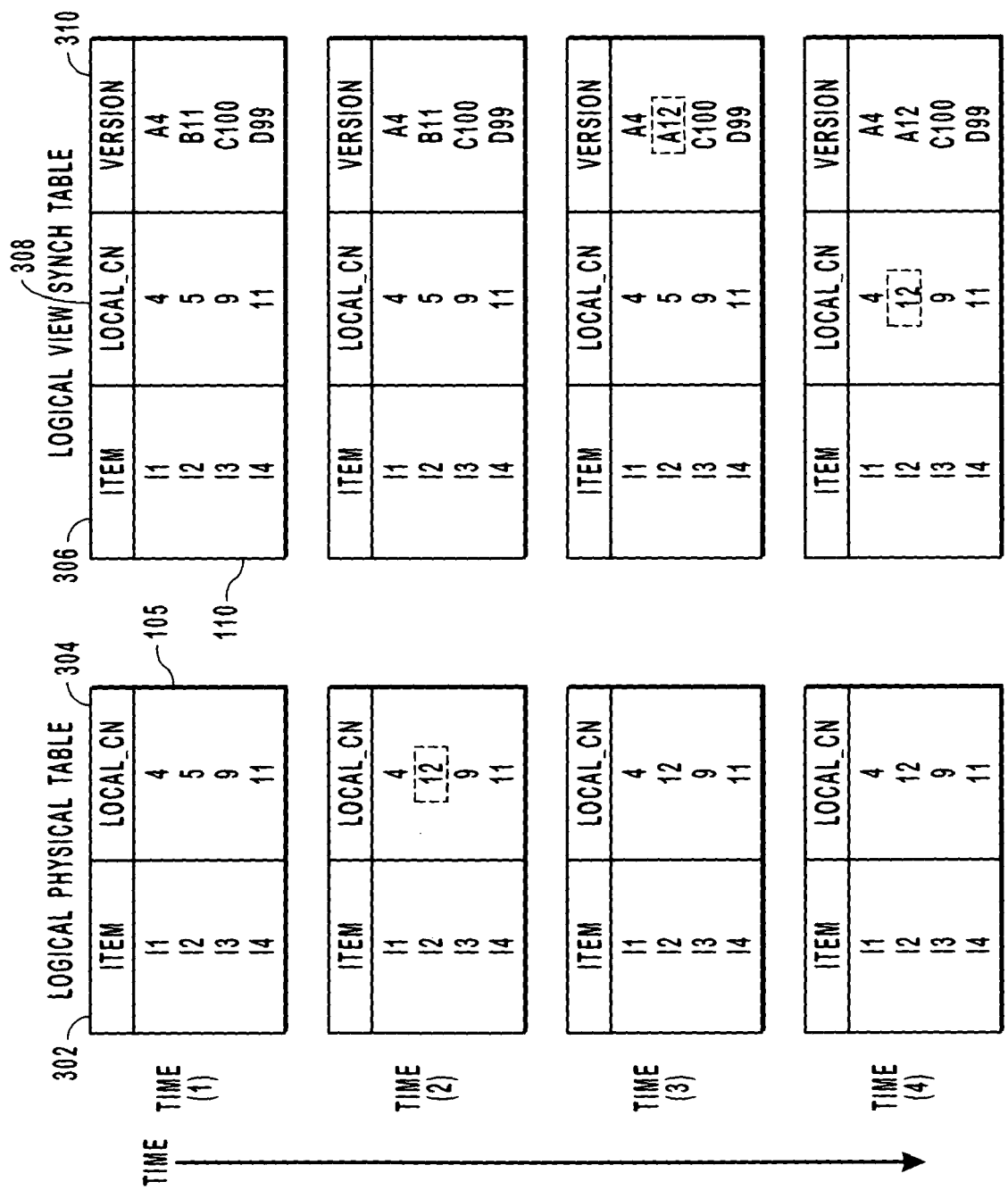
FIG. 3A illustrates an example tables useful for storing items, change enumerations, and versions in accordance with principles of the present invention.

In one embodiment of the invention, changes that are made locally, such as those made through a user interface can be distinguished from changes resulting from synchronization. Referring now to FIGS. 1 and 3A such functionality is explained. Replica 102, as stated above, comprises physical tables 105 and 106 stored in the data store layer 126. FIG. 3A illustrates a time wise progression showing how updates made through a user interface 134 are synchronized using the physical tables 105 and 106 and the logical views 110. The physical table 105 illustrated in FIG. 3A has two columns; namely an item column 302 and a local change enumeration (LOCAL_CN) column 304. The item column 302 contains the items stored in the replica 102. The local change enumeration column 304 includes local change enumerations that the data store 126 assigns as labels to the items. The local change enumeration associated with each item is incrementally updated each time a change is made to an item. The data store layer 126 assigns local change enumerations to all changes irrespective of whether those changes are made through the user interface or received through synchronization. A local change tracker may include the local change enumeration column 304.

The logical view 110 includes a table with three columns; namely an item column 306 that stores the items mapped from the physical tables 105 and 106 through the catalog 114, a synchronization local change enumeration column 308 that stores a synchronization form of local change enumerations assigned to the items, and a version column 310 that includes versions including information about a replica within the topology that made the change or that assigned the version to the item and the chronological order in which the item was added or changed. A synchronization change tracker may include the information in the synchronization local change enumeration column 308 and the version column 310.

At time (1) the replica of 102 is in a steady state. At time (2), a change is made to the item labeled I2 through the user interface 134. A local change enumeration is assigned to I2, that local change enumeration is the next chronological change enumeration available, such as in this case, 12.

At time (3), the replica 102 receives an indication that synchronization should be performed. At the synchronization layer 128, the replica 102 checks the logical view table 110 by comparing the synchronization local change enumeration 308 with the local change enumeration in column 304. The replica 102 discovers that changes have been made to the physical tables 105 and 106 because the local change enumeration in column 304 does not match the synchronization local change enumeration in column 308. Namely the local change enumeration has a value of 12 and the synchronization local change enumeration has a value of 5. Thus, the replica 102 updates the version in column 310 to A12 which indicates that the change was made at replica 102 (in this example replica 102 is labeled as replica A in the topology) and that replica 102 assigned a local change enumeration of 12. About the same time, the item labeled I2 is mapped from the local tables 105 and 106 to the logical view table 110. Then at time (4), the synchronization local change enumeration in column 308 is updated to match the local change enumeration in column 304. Then items in the logical view 110, including items mapped from the physical tables 105 and 106, can be synchronized with other replicas within the topology 100.

Figure 3B:
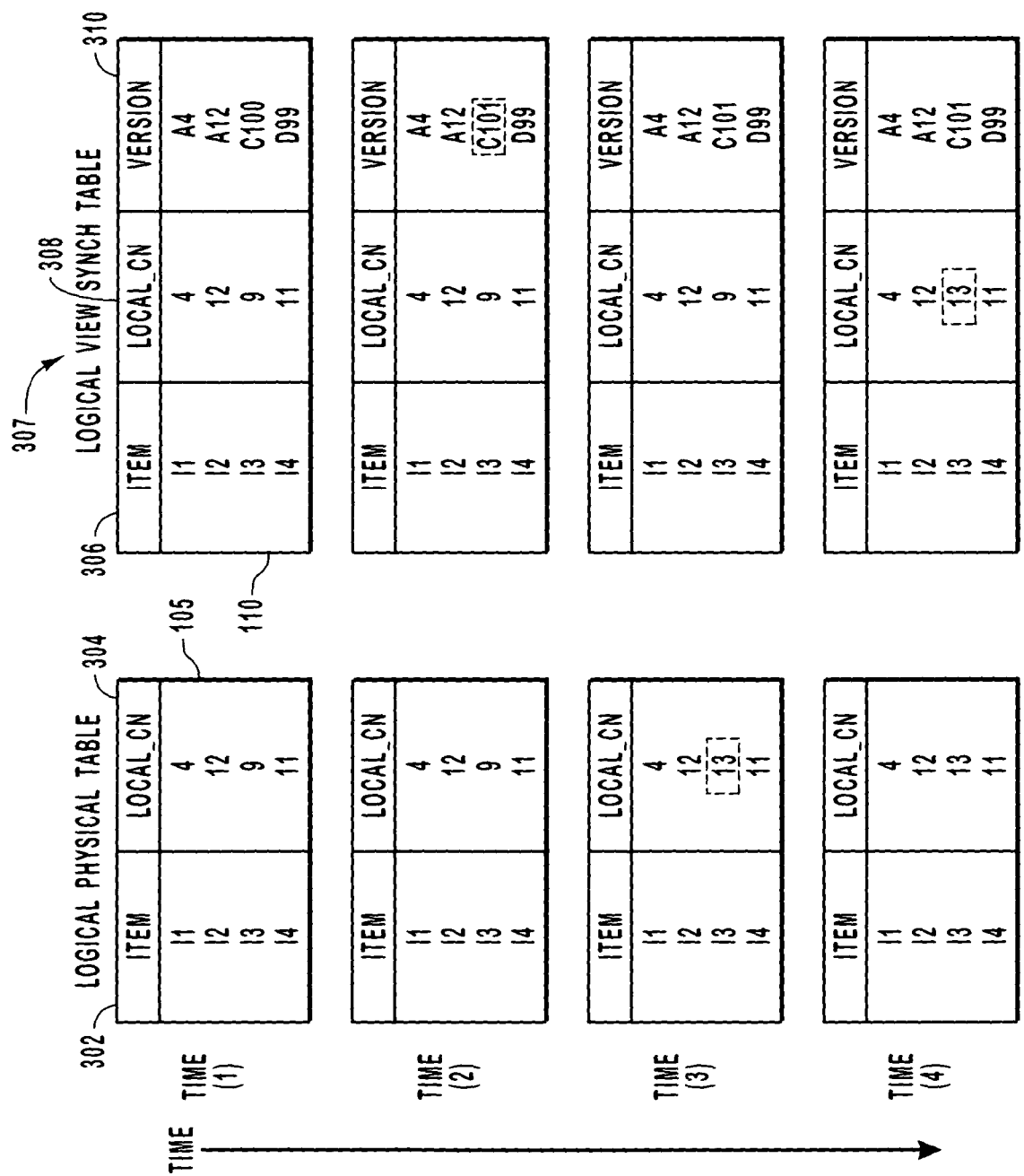
FIG. 3B illustrate an example tables useful for storing items, change enumerations, and versions in accordance with principles of the present invention.

Referring now to FIG. 3B, an example of updating a replica, including the local tables, as a result of synchronization is shown. At time (1) the replica 102 is in a steady state having not received any new items or changes to items from the other replicas within the topology. At time (2) a change is received at the logical view table 110 to the item I3. The change to item I3 has the version C101. This change is sent from the logical view table 110 through the catalog 114 to a physical table 105. Upon receipt of the change, the data store layer 126 assigns a local change enumeration that is the next change enumeration available for assignment by the data store layer 126. In this case, the local change enumeration is 13 as is shown in column 304 at time (3). Immediately or shortly thereafter shown in time (4) at the synchronization layer 128 a check is made to discover the local change enumeration in column 304 assigned to the change. The local change enumeration in column 304 is updated to the synchronization local change enumeration in column 308. In this way, the synchronization layer will know that so long as the local change enumeration in column 304 and synchronization local change enumeration in column 308 match, that no local changes that have not been synchronized have been made to item I3 through the user interfaces 134. Further, the version in column 310 contains information about which replica made the change and the chronological order that the change was made (in this case a replica labeled C at time 101).

Figure 4:
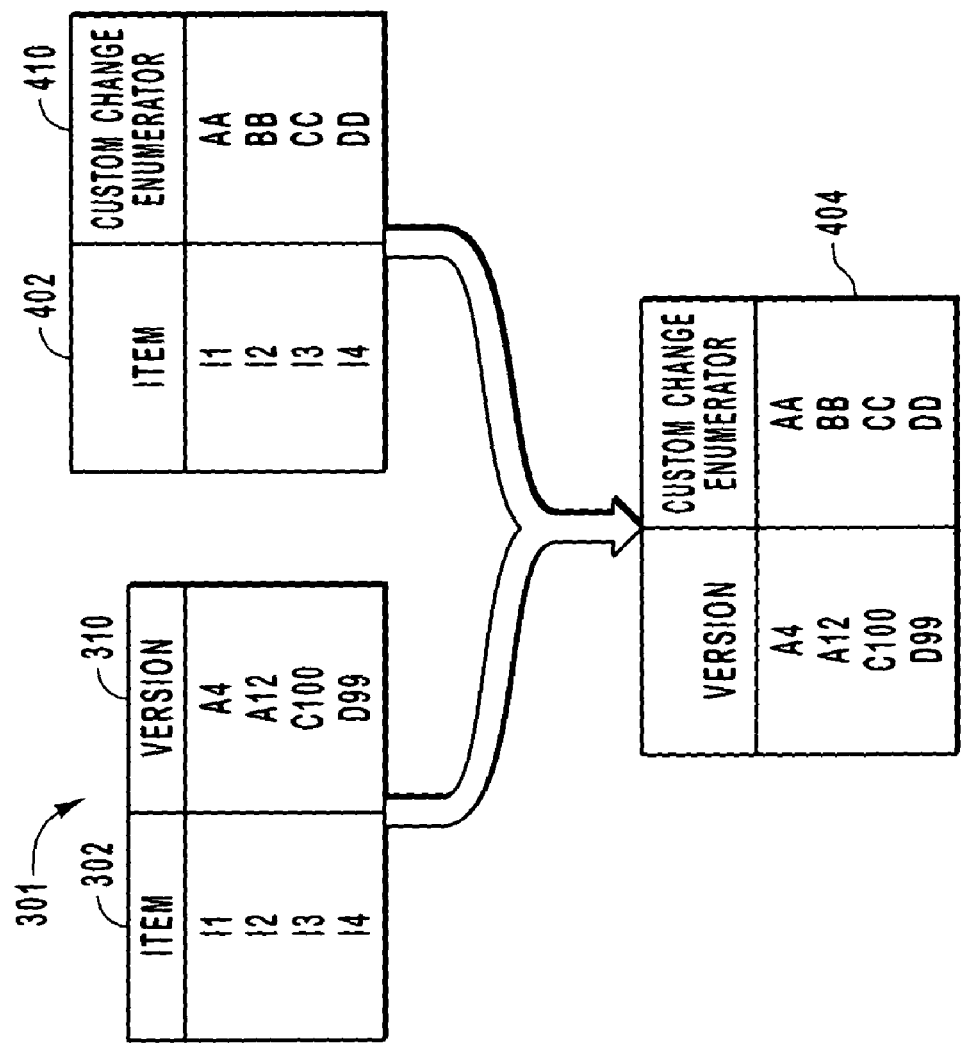
FIG. 4 illustrates example tables for mapping logical views to custom views in accordance with principles of the present invention.

In some embodiments of the invention, there may be a need to provide custom views that are different than the logical views discussed previously. Namely, the logical views discussed previously have a similar layout on all replicas such that synchronization efficiency is maximized. However, there may be cases where a replica is added to the topology where the replica was not designed with the logical views and cannot be updated to include them. Nonetheless, embodiments of the invention contemplate being compatible with these custom replicas. Referring now to FIG. 4, one way of accommodating these custom replicas is shown. FIG. 4 generally shows a system that maps the versions in column 310 assigned in the synchronization layer (such as layer 128 shown in FIG. 1) and custom change enumerations in column 410 generally assigned by the custom replicas to a custom view 404. Synchronization can then occur as described above with the additional act of sending and receiving the items through the custom view 404. For example, when an item is sent from a replica to a custom replica, the item can be assigned the appropriate custom change enumeration prior to sending.

When receiving items, by consulting the custom view 404 the appropriate version can be assigned and the item mapped to the appropriate location in the logical view (such as logical view 110 shown in FIG. 1).

Figure 5:
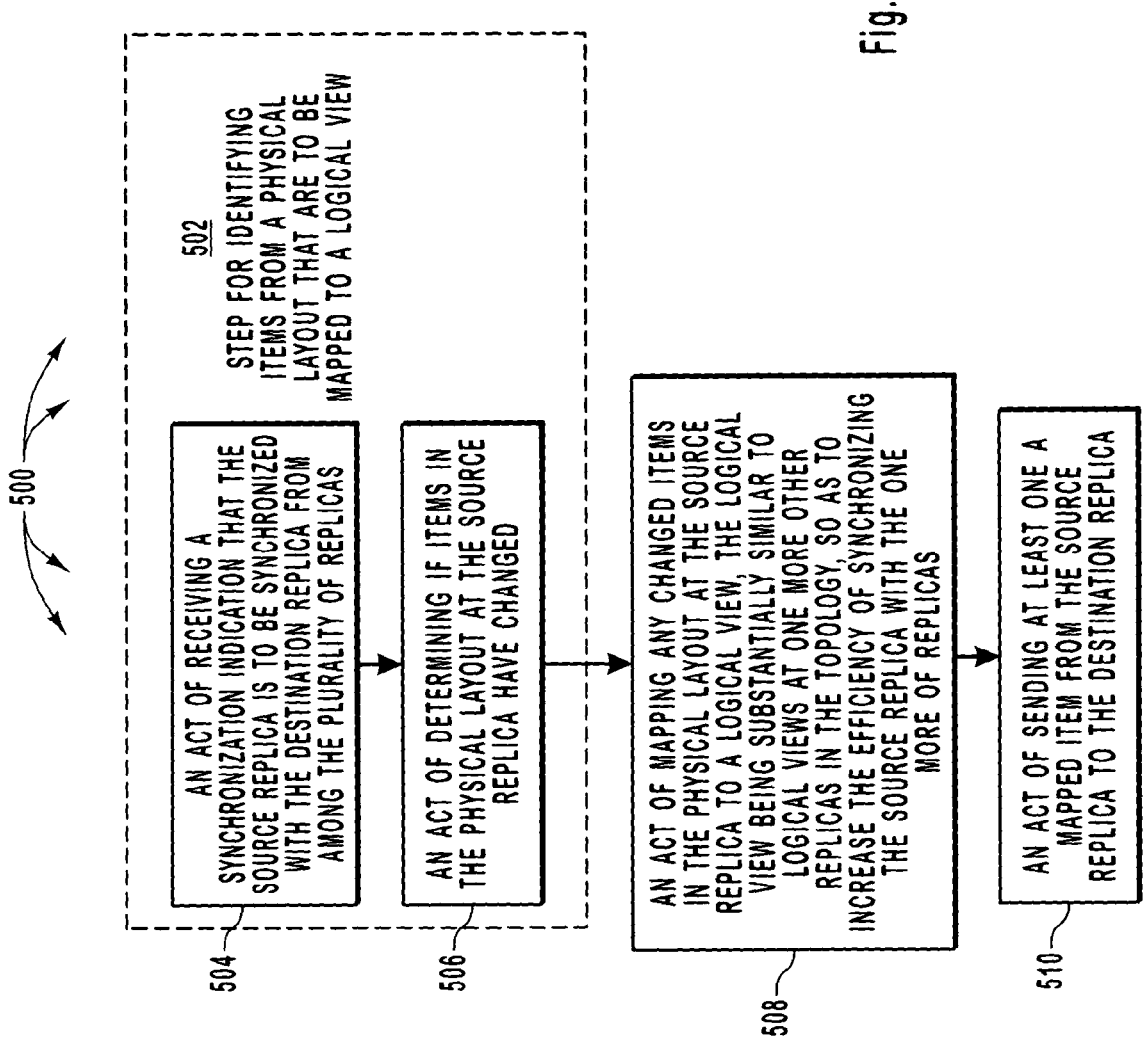
FIG. 5 illustrates an example method for synchronizing replicas using aspects of some embodiments of the present invention.

FIG. 5 illustrates an example method 500 for synchronizing replicas using aspects of some embodiments of the present invention. The method 500 may be practiced in a computer architecture such at that shown in FIG. 1. Accordingly, the method of FIG. 5 will be described with reference to the elements in FIG. 1. The method 500 includes a functional result oriented step for identifying items from a physical layout that are to be mapped to a logical view (step 502). Step 502 can include any corresponding acts for identifying items from a physical layout that are to be mapped to a logical view.

However, in the example method in FIG. 5, step 502 includes a corresponding act of receiving a synchronization indication that a source replica should be synchronized with a destination replica (act 504). Act 504 can include a computer system receiving an indication that a source replica is to be synchronized with a destination replica. For example, a computer system that includes replica 102 can receive an indication that replica 102 is to be synchronized with replica 104.

Act 504 can occur at the synchronization layer of a replica such as a synchronization layer 128 of replica 102 shown in FIG. 1. Replica 102 is in a topology 100 that includes other replicas with which data may be synchronized. The indication set forth in act 504 may originate from a number of different sources including a synchronization request from another replica within the topology 100 or from the expiration of a timer within the replica 102 or by the setting of a flag as the result of some change to data stored in the database layer 126. Various other indications, although not specifically set forth herein, may also be suitable indications that may be received to indicate that synchronization should be performed.

Step 502 also includes a corresponding act of determining if items in a physical layout at the source replica have changed (act 506). Act 506 can include a computer system determining if items in a physical layout at the source replica have changed. For example, a computer system including replica 102 can determine if items physically stored in the tables 105 and 106 have changed.

One embodiment of act 506 is illustrated in FIG. 3A at a time (2) where, as previously discussed, synchronization local change enumeration in column 308 is compared with a local change enumeration in column 304.

The local change enumeration in column 304 is in the data store layer 126 of the replica 102 and is associated by the data store layer 126 to an item, for example, in table 105. The synchronization local change enumeration in column 308 is associated with items mapped to a logical view 110 at the replica 102 where the mapped items have corresponding items in the physical layout of the tables 105 and 106. The local change enumeration in column 304 may be changed independently of the synchronization local change enumeration in column 308. Thus, when local changes are made, the local change enumeration in column 304 is changed to a different value than the value of the synchronization local change enumeration in column 308.

As such, when performing act 506, a comparison of local change enumerations and synchronization local change enumerations can be used to determine if changes have been made to items in the physical layout at the source replica. For example, different values for the local change enumeration and the synchronization local enumeration can indicate changes in the physical layout. If an item was changed at a replica other than the replica in which the item is stored, or if the item has been synchronized with another replica in the topology, the local change enumeration and the synchronization change enumeration can be the same number. The discussion of FIGS. 3A and 3B above describe an example of how this is accomplished in one embodiment of the invention.

A synchronization change tracker at the synchronization layer of the replica maintains versions and synchronization local change enumerations associated with the items mapped to the logical views. For example, table 307 can be located at synchronization layer 128. The versions in a synchronization change tracker may include replica IDs that identify the replica that made changes to items associated with the corresponding version. The version may also include replica change enumerations identifying a chronological order that changes were made on the replicas. In FIG. 3A, to item I1 (in column 306) is associated with the version A4 where A is the replica ID (e.g., identifying replica 102) and 4 is the replica change enumeration. Thus a change to item I1 was made at a replica 102 in a chronological order 4. The replica ID, in some embodiments of the invention, identifies a replica other than the replica that made the change. In these embodiments, a replica will be used to assign versions to changes made by several different replicas within the topology. This may be referred to as surrogate authoring.

Method 500 may also include defining a change unit for each of the items in a physical layout where the change unit defines the granularity of an item. The change unit may be defined in a logical schema or logical structure such as is shown in FIGS. 2A and 2B.

Method 500 may also include defining a consistency unit in a logical schema. A consistency unit includes a plurality items of a defined granularity that must be received by a replica for any of the change units to be applied by that replica. For example, FIG. 2B shows an address consistency unit 260 that includes street 262, city 264, state 266, and ZIP 268 change units. If during synchronization, any changed items of the street 262, city 264, state 266, and ZIP 268 change units are not received by a replica, none of the items will be updated at the replica. When all of the items in the consistency unit are received, all of the items can be updated together in the replica.

Method 500 may also include compiling the logical schema to create a catalog, for example, similar to catalog 114. The catalog contains information about where items are physically laid out in physical tables 105 and 106. More specifically, in one embodiment of the invention, the catalog contains detailed meta data and instructions for generating procedures and functions to map items in physical storage to items in logical views. Thus, the catalog is used to map the items in the physical tables 105 and 106 to logical view 110. When the logical schema is compiled, procedures or functions code may also be generated. The procedures or functions code can be stored at the data base layer of a replica (such as database layer 126 at replica 102). The procedures or functions code provides functionality for storing items in the physical layout of the physical tables (such as physical tables 105 and 106) such as directing how items will be stored in the tables.

Method 500 may also include installing a catalog prior to act 504. A catalog may be provided by a developer or other source where the catalog was developed and compiled at other computer systems than the computer system described above. The catalog is then provided as installable code that can be run at the subject computer system. Similarly, procedures or functions code can be provided and installed at the computer system as well.

Method 500 may also include defining a folder at a replica that includes some of the items at the replica. Another replica in the topology may also include a corresponding folder with corresponding items. FIG. 1 shows a folder 120 at replica 102 that corresponds to a folder 124 at replica 104. A replica can optimize the synchronization of folders by sending only items that need to be synchronized and that are in the folders.

Method 500 also includes an act of mapping any changed items in the physically layout at the source replica to a logical view (act 508). Act 508 can include a computer system mapping any changed items in the physically layout at the source replica to a logical view. For example, a computer system including replica 102 can map items stored in the physical tables 105 and 106 through a catalog 114 into a logical view 110. A logical view at one replica can be substantially similar to logical views at one or more other replicas in the topology. For example, logical view 110 can be substantially similar to logical view 112. This can increase the efficiency of synchronizing the replicas in the topology 100.

Method 500 also includes an act of sending at least one mapped item from the source replica to a destination replica (act 510). Act 510 can include replica 102 sending items from logical view 110 to logical view 112. For example, replica 102 may send one or more items from a contact similar to contact 252 to replica 104.

Method 500 may also include mapping logical views to custom views. Mapping logical views to custom views can include mapping versions (e.g., in column 310) to custom change enumerations (e.g., in column 410). A custom replica can assign custom change enumerations to custom items in the custom replica. The custom change enumerations can correlate with versions (such as custom view 404 shown in FIG. 4). The custom change enumerations are can be in a different format (e.g., a different data format) than the local changes.

Synchronization can then occur as described above with the additional act of sending and receiving the items through the custom view. For example, when an item is sent from a replica to a custom replica, the item can be assigned the appropriate custom change enumeration prior to sending. When receiving items, by consulting the custom view 404 the appropriate version can be assigned and the item mapped to the appropriate location in the logical view (such as logical view 110 shown in FIG. 1).

Figure 6:
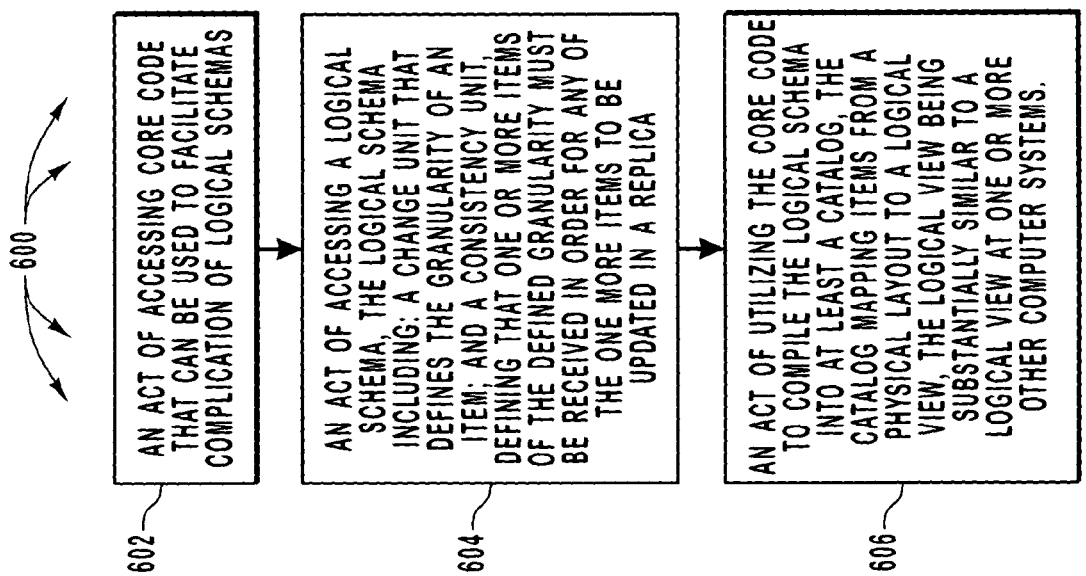
FIG. 6 illustrates an example method for generating a mapping of the physical layout of items in a data store to items in a logical view using aspects of some embodiments of the present invention.

Referring now to FIG. 6, a method for generating a mapping of the physical layout of items in a data store to a logical view is illustrated as method 600. Method 600 includes an act of accessing core code that can be used to facilitate compilation of logical schemas (act 602). Act 602 can include a replica (e.g., at a computer system) accessing core code that can be used to facilitate compilation of logical schemas. For example, replica 102 can access core code that facilitates the compilation of logical schema to physical schema mapping. Act 602 may be accomplished in one embodiment of the invention by a developer creating code with the appropriate functionality and installing the code at a compiling computer system. The compiling computer system then accesses the code.

Method 600 further includes an act of accessing a logical schema (act 604). Act 604 can include a replica (e.g., at a computer system) accessing a logical schema. For example, replica 102 may access a logical schema. In one embodiment of the invention the logical schema includes a change unit that defines the granularity of an item. The logical schema may also include a consistency unit that defines one or more items of the defined granularity the changes of which must be received at another computer system in order for any of the one or more items to be updated in the other computer system.

In one embodiment of the invention, the schema is designed by a developer at design time. A developer designing a particular type of data store can define change units to optimize the granularity for the particular application. For example, change units can be defined to reduce the amount of metadata that needs to be maintained by defining larger change units, or designed to reduce the incidence of conflicts by defining smaller change units, or some balance between the two. Because change unit granularity can be defined in a logical schema, a developer does not need to write new computer executable code to define the change unit.

Defining a consistency unit may also be performed by the developer at design time. Defining consistency units is described in more detail above in connection with the description of FIGS. 2A and 2B. Defining consistency units helps to ensure that items that should be updated together are updated together. Because consistency units can be defined in a logical schema, a developer does not need to write new computer executable code to define the consistency unit.

Method 600 further includes an act of utilizing the core code to compile the logical schema into a catalog (act 606). Act 606 can include a replica (e.g., at a computer system) utilizing the core code to compile the logical schema into a catalog. For example, replica 102 can utilize accessed core code to compile an accessed logical schema into catalog 114. Compiling a logical schema to physical schema mapping can result in the creation of a catalog (such as catalog 114 shown in FIG. 1) that can be stored at the synchronization layer (such as layer 128 in FIG. 1) of a replica (such as replica 102 in FIG. 1).

The catalog contains information for mapping items from physical tables (such as physical tables 105 and 106 in FIG. 1) to logical views (such as logical view 110 in FIG. 1). The logical views may be substantially similar at one or more other computer systems in the topology. Act 606 may also create procedures or functions code. The procedures or functions code is located at the data store layer of a replica (such as data store layer 126 at replica 102 shown in FIG. 1). The procedures or functions code contains computer executable instructions directing the physical storage of items in physical tables (such as tables 105 and 106 in FIG. 1).

Method 600 may also include configuring the compiling computer system to send items to other computers systems within the topology through the logical views. Other computer systems within the topology have logical views that are substantially similar to the logical view at the computer system. Examples of sending items through logical view have been discussed above in more detail in the description of FIG. 1.

Method 600 may also install the catalog to a computer system for use with a data store configured in the physical layout. The data store may be installed on the computer system prior to the catalog being installed onto it, subsequent to the catalog being installed onto it, or in the same operation as installing. Installing may be done in a number of ways including through a network or by physically placing the catalog on a portable storage medium such as a computer disk or CD-ROM and transporting to the computer system.

Method 600 may also send the catalog to a computer system for use with a replica that is configured to synchronize data according to the logical view. The replica may be configured prior to sending the catalog, subsequent to sending the catalog, or in the same operation as sending.

The computer system may be divided into a data store layer and a synchronization layer. The data store layer may be similar to the data store layer 126 (FIG. 1) described above. The synchronization layer may be similar to the synchronization layer 128 described above.

Method 600 may also store a local change tracker at the data store layer (such as layer 126 in FIG. 1) of the computer system. The local change tracker maintains local change enumerations for items stored in the source replica. Exemplary embodiments of a local change tracker are shown in FIGS. 3A and 3B. Method 600 may also store a synchronization change tracker at the synchronization layer (such as layer 128 in FIG. 1). The synchronization change tracker maintains versions (such as those shown in column 310 in FIGS. 3A and 3B) and synchronization local change enumerations (such as those shown in column 308 in FIGS. 3A and 3B). The version may contain a replica ID corresponding to a computer system in the topology and a change enumeration corresponding to a chronological order that a change was made. The replica ID, in some embodiments, corresponds to the computer system that made the change associated with the version. In other embodiments, one computer system may assign versions for several computer systems such that the replica ID corresponds to the computer system assigning versions.

The local change enumeration and synchronization local change enumeration can be used to identify if the changed items should be sent and thus should be mapped from the physical layout to the logical view. When changes are made through a user interface (such as user interface 134 shown in FIG. 1), a local change enumeration is assigned to the change. Thus, an item in the data store layer (such as layer 126 in FIG. 1) will have a local change enumeration that is different than the synchronization local change enumeration associated with the item in the synchronization layer (such as layer 128 in FIG. 1). The computer system can then recognize during a synchronization that the item that has been changed through the user interface needs to be assigned a valid version number and synchronized with other computer systems. This process is discussed more thoroughly above in connection with the description of FIGS. 3A and 3B.

Method 600 may also include storing a folder in the data store layer where the folder can group items together. An example of such a folder is shown in FIG. 1 as folder 120. Storing a folder may include using a table (such as table 118 in FIG. 1) to correlate items to a folder. Items may be sent to other computer systems using the folder. In this way only selected items are sent rather than all items that may exist at a computer system.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 30 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 736, other program modules 737, and program data 738. A user may enter commands and information into the computer 20 through keyboard 740, pointing device 742, or other input devices (not shown), such as a microphone, joy stick, game pad, satellite dish, scanner, or the like. These and other input devices are often connected to the processing unit 721 through a serial port interface 46 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 783 and 793. Remote computers 783 and 793 may each be another personal computer, a server, a router, a network PC, a peer device or other common network node, and typically include many or all of the elements described above relative to the computer 720. The logical connections depicted in FIG. 1 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computer network comprised of a plurality of different types of platforms for storing replicas of the same data, and wherein the limitations or features of a particular platform may require the data of a replica to be stored in a different physical arrangement at the data store layer of the particular platform, and wherein when synchronizing the replicas the data for each replica must be mapped from the different physical arrangement at each platform into a logical view table of a synchronization layer of the particular platform that has a similar layout to the logical view table at each of the other different types of platforms, a method for mapping of the physical layout of items in a data store layer of a platform to a logical view in a synchronization layer of the platform, the method comprising:

an act of compiling at the computer system of a particular platform a logical schema into a catalog that can be used to define a logical view that has a similar layout to the logical view for each platform, and that includes a logical grouping of data items by defining the data items in terms of, a change unit that defines the granularity of a group of data items in the sense that if any part of the group of data items is modified, the entire group of data items will be synchronized when synchronizing other replicas; and a consistency unit, defining the minimum group of data items that must be reported during synchronization if any item of the group is changed;

an act of utilizing the catalog to map items from a physical layout to the logical view that has a similar layout to the logical view at different platforms of one or more other computer systems; and an act of storing a synchronization tracker in the logical view table at the synchronization level for each platform, the synchronization tracker maintaining:

a version change enumeration corresponding to a synchronized version of a data item in the logical view of the computer system; and a source identifier identifying a particular replica upon which the synchronized version of the data item is based.

2. The method as defined in claim 1, wherein the synchronization layer of the computer system includes a logical schema that is compiled into one or more catalogs, the one or more catalogs being in extensible mark-up language (XML).

3. The method as defined in claim 1 wherein the physical arrangement at the data store layer for each computer system is defined by one or more physical tables, and wherein the physical arrangement defined by the physical tables of at least one of the computer systems is different from the physical arrangement defined by the physical tables of the other computer systems.

4. The method as defined in claim 3, wherein the data store layer of each platform of each computer system where a replica is stored includes a user interface that includes procedures or functions code, the procedures or functions code being adapted to arrange the data for the replica in the physical tables of the data store layer.

5. The method as defined in claim 3, further comprising:
an act of storing a local change tracker in the one or more physical tables at the data store layer of each platform, the local change tracker maintaining local change enumerations for items stored in the data store layer of a platform;
wherein by comparing the local change tracker with the synchronization tracker, the computer system of each platform can determine if an item stored in the data store layer of the computer system should be sent and thus mapped to the logical view in the synchronization layer of the computer system.

6. The method of claim 5, wherein if the local change enumeration and the version change enumeration comprise different values, then the item stored in the data store layer of the computer system should be mapped to the logical view.

7. The method of claim 5, wherein if the local change enumeration and the version change enumeration comprise the same value, then the item stored in the data store layer of the computer system does not need to be mapped to the logical view.

8. The method of claim 5, wherein
a change in an item of data for a replica stored at a particular platform caused by a different version of the replica created by a computer system of another platform is identified by the source identifier corresponding to the computer system of the other platform, and
wherein a change in an item of data for a replica stored at a particular platform caused by a change created in the one or more physical tables of the data store of the particular platform is identified by a change enumeration corresponding to a chronological order that the change was made.

9. In a computer network comprised of a plurality of different types of platforms for storing replicas of the same data, and wherein the limitations or features of a particular platform may require the data of a replica to be stored in a different physical arrangement at the data store layer of the particular platform, and wherein when synchronizing the replicas the data for each replica must be mapped from the different physical arrangement at each platform into a logical view table of a synchronization layer of the particular platform that has a similar layout to the logical view table at each of the other different types of platforms, a computer program product for implementing within the computer network a method for mapping of the physical layout of items in a data store layer of a platform to a logical view in a synchronization layer of the platform, the computer program product comprising a computer readable-medium having stored thereon computer-executable instructions for implementing the method, and wherein the method is comprised of:
an act of compiling at the computer system of the platform a logical schema into a catalog that can be used to define a logical view that has a similar layout to the logical view for each platform, and that includes a logical grouping of data items by defining the data items in terms of,
a change unit that defines the granularity of a group of data items in the sense that if any part of the group of data items is modified, the entire group of data items will be synchronized when synchronizing other replicas; and
a consistency unit, defining the minimum group of data items that must be reported during synchronization if any item of the group is changed;
an act of utilizing the catalog to map items from a physical layout to the logical view that has a similar layout to the logical view at different platforms of one or more other computer system; and
an act of storing a synchronization tracker in the logical view table at the synchronization level for each platform, the synchronization tracker maintaining:
a version change enumeration corresponding to a synchronized version of a data item in the logical view of the computer system; and
a source identifier identifying a particular replica upon which the synchronized version of the data item is based.

10. The method as defined in claims 1 or 9, wherein the platform at each computer system wherein a replica is stored includes in the synchronization layer of the computer system a logical schema that is compiled into a catalog that can be used to define a logical view that has a layout which is similar for each platform.

11. The method as defined in claims 1 or 9, wherein the physical arrangement at the data store layer of the platform for each computer system at which a replica is stored is defined by one or more physical tables for storing the data of the replica.

12. The method as defined in claims 1 or 9, wherein
the data store layer of the platform for each computer system at which a replica is stored includes one or more folders in which items grouped in a common folder can be synchronized, thereby defining the scope of synchronization between synchronization layers of different platforms, and
wherein the items grouped in a common folder that can be synchronized are less than all of the items stored for a replica.

* * * * *